United States Patent

Plank et al.

[15] 3,669,875
[45] June 13, 1972

[54] TWO-STAGE REFORMING PROCESS

[72] Inventors: Charles J. Plank, Woodbury; Pharez G. Waldo, Wenonah; Harry G. Doherty, Pitman, all of N.J.

[73] Assignee: Mobil Oil Corporation

[22] Filed: Oct. 13, 1969

[21] Appl. No.: 865,810

[52] U.S. Cl. ........................................208/65, 208/138
[51] Int. Cl. ..................................C10g 35/08, C10g 39/00
[58] Field of Search ..................208/63, 65, 138; 260/65

[56] References Cited

UNITED STATES PATENTS

| | | | |
|---|---|---|---|
| 3,424,669 | 1/1969 | Carter et al. | 208/65 |
| 2,870,084 | 1/1959 | Strecker et al. | 208/136 |
| 2,952,611 | 9/1960 | Haxton et al. | 208/65 |
| 3,111,480 | 11/1963 | Bowles et al. | 208/65 |
| 3,287,253 | 11/1966 | McHenry et al. | 208/65 |
| 3,474,026 | 10/1969 | Derr et al. | 208/65 |
| 3,392,107 | 7/1968 | Pfefferle | 208/138 |

Primary Examiner—Herbert Levine
Attorney—Oswald G. Hayes, Andrew L. Gaboriault and Carl D. Farnsworth

[57] ABSTRACT

A naphtha hydrocarbon fraction is reformed in a plurality of catalytic reforming zones under conditions which are particularly selective for effecting naphthene dehydrogenation in a first stage and paraffin cyclization to form aromatics in a second stage so that below about 5 weight percent of naphthenes remain in the paraffin-rich charge passed to the second stage operated at a space velocity greater than 3 LHSV and maintained at a pressure below about 100 psig.

6 Claims, 1 Drawing Figure

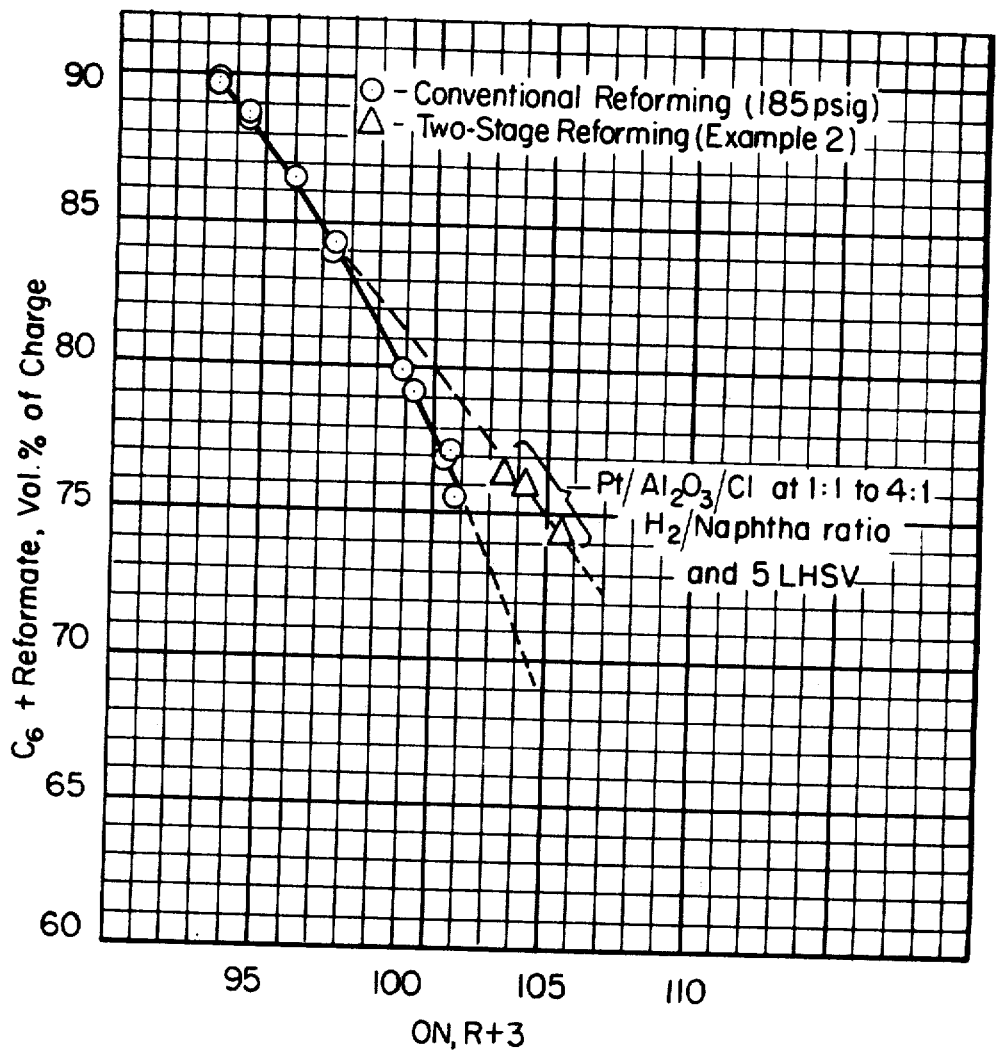

TWO-STAGE REFORMING PROCESS

BACKGROUND OF THE INVENTION

Reforming is well known and performs a major function in the present-day petroleum refinery industry. It represents a convenient method for upgrading gasoline boiling range hydrocarbons having a relatively low octane number to aromatic enriched product having an octane rating in excess of 100. It is thus of economic importance and considerable energy has been expended to improve upon the reforming operation so that less critical charge material can be upgraded to a desired product with a minimum loss in volume of product available from the charge material. It is well recognized that in reforming a number of reactions occur and that each reaction can be particularly favored by adjustment of reaction conditions in cooperation with a particular composition. In naphtha reforming operations endothermic reactions predominate in the first stages of reforming while exothermic reactions increase and may even predominate in the later stages of the reforming operation. Furthermore, specific operating conditions are selected for use in conjunction with the particular catalyst and hydrocarbon charge employed. To take advantage of the reactions and reaction sequence in catalytic reforming it has been the practice to employ in combination a plurality of fixed bed reactors arranged in series with provision for adjusting the temperature essential by reheating of the hydrocarbon reactant between reactors. Generally, for a matter of economic convenience the pressure employed in each reactor is decreased in the direction of hydrocarbon flow sequentially through the plurality of reactors to avoid use of expensive compressors between the separate reactors. Thus the pressure drop will be not substantially more than that encountered by the reactants passing through the reactors, catalyst beds, heaters and inter-connecting piping to provide the desired flow of reactants therethrough. In addition the vapor inlet temperature selected for each reactor is dependent upon the charge stock composition, the hydrogen to hydrocarbon ratio employed, the reactant space velocity, the type and distribution of catalyst in the plurality of the reactors, the degree of conversion desired and product selectivity desired from the reactors. Catalytic reforming of hydrocarbons generally comprises four major reactions which can be adjusted in magnitude by reaction conditions and catalyst employed. The predominant reaction in the first stage of reforming is known to be dehydrogenation to convert naphthenes to aromatics. Another reaction essential in this stage is the isomerization of cyclopentanes to cyclohexanes. Other reactions which occur and are controllable to some extent are the cracking of naphthenes and paraffins and the isomerization of paraffins. The major reforming reaction which may occur in a subsequent stage is dehydrocyclization of straight chain paraffins to aromatics thereby further increasing the octane rating of the product material. In dehydrocyclization reactions, the paraffins are cyclized and dehydrogenated to form aromatics. To maximize product volume from a given charge material a closely controlled operation to optimize both platinum type hydrogenation-dehydrogenation and acidic catalyst functions is required. A third reaction of importance in reforming is concerned with the isomerization of paraffins, olefins, and naphthenes. The isomerization of paraffins not cyclized results in significant octane improvement and requires an acid function. It is well known, however, that acid functions contribute to cracking and therefore hydrocracking of constituents in the hydrocarbon charge must be selectively controlled to avoid producing undesired gaseous components and carbonaceous material formation in the reforming operation. In the prior art practice of reforming naphthene charge material in the gasoline boiling range it has been found desirable to maintain a selective balance in the acidic and hydrogenation-dehydrogenation functions of the reforming catalyst so that the selectivity of the reforming operation can be related to the charge stock composition, operating conditions and reformate product desired.

In practice reforming catalysts of the prior art have particularly included a platinum group metal selected from within relatively narrow limits of from about 0.15 percent to about 1.0 percent by weight of the catalyst. At these concentrations the active platinum sites may be spread throughout the support matrix and the activity level of the hydrogenation-dehydrogenation function can be controlled substantially as desired. In addition the catalyst acid function has been limited to maintain a desired balance with the hydrogenation-dehydrogenation function of the catalyst. Platinum type reforming catalysts have been modified by a great number of activating agents or promoters as a basis for improvement upon the selectivity of the reforming operation. However, because of inherent difficulties in operation and problems associated with improving upon catalyst life between regenerations the industry will continue to search for methods for improving upon the already known reforming operation.

The present invention is concerned with a method for improving upon the reforming of naphthas boiling in the gasoline boiling range to produce a product having an octane number in excess of 100 and preferably in excess of 103 R+3.

SUMMARY OF THE INVENTION

A naphtha hydrocarbon fraction boiling in the gasoline boiling range is upgraded to an aromatic enriched product by improving upon the reactions of dehydrogenation of naphthenes and cyclization of paraffins in a two-stage operation wherein the naphthene content of the first stage effluent is maintained below 5 percent by volume and the stage is carried out at a lower pressure than the first stage reforming pressure. First stage pressure is in the range of 135 to 600 psig and the second stage pressure is less than 100 psig employing a reactant space velocity (LHSV) greater than 3 and preferably at least 4 v/v/hr.

THE DRAWING

The drawing presented herein and referred to in the example presents a relationship by curves of the yield-octane results obtained by conventional reforming in comparison with a reforming operation practising the concept of the present invention.

INVENTION

This invention relates to hydrocarbon conversion reactions and the method for performing particular hydrocarbon reactions with catalyst compositions. More particularly, the present invention is directed to a process for effecting the rearrangement of hydrocarbon molecules in the presence of hydrogen to produce improved yields of a product of considerably improved octane rating. More particularly the present invention is concerned with effecting reforming of a hydrocarbon charge material boiling in the gasoline boiling range under conditions which efficiently contribute to the formation of aromatics in a greater amount than has been the practice herebefore. Thus the present invention is concerned with a reforming operation involving the use of noble metal type reforming catalysts arranged in a sequence of catalyst contact steps which can be more selectively controlled to optimize desired product constituents. In this combination and method of this invention, the first stage of the reforming operation comprising a single catalyst bed or a plurality of catalyst beds in sequence is particularly concerned with converting naphthenes in the hydrocarbon charge by dehydrogenation to aromatics with a limited degree of cracking of naphthenes and paraffins in the charge. This first stage naphthene dehydrogenation may be accomplished in a single bed of catalyst or a plurality of sequentially arranged catalyst beds may be employed with advantage when maintained under particularly selected temperature and pressure conditions. The pressure employed in the first stage is selected from within the range of from about 135 psig up to about 600 psig in combination with a reactant space velocity which is most effective or particularly effective for optimizing the aromatization of naphthenes so that the concentration thereof will be reduced to less than about 15 percent, more usually less than 10 percent but preferably less than about 5 percent by volume before effecting any significant cyclization to aromatics of the paraffin constituents remaining in the charge. It is important in the interest of optimizing product yields and the efficiency of operation that cracking of naphthenes and paraffins during this first stage endothermic dehydrogenation operation be limited to a yield below about 10 percent by weight, preferably below about 5 percent by weight of $C_3$ and lighter cracked hydrocarbons. In the first stage the dehydrogenation of naphthenes is accomplished in the presence of a noble metal hydrogenation-dehydrogenation reforming catalyst such as platinum, palladium or rhodium dispersed in a suitable matrix such as alumina primarily in the eta, gamma, or mixed eta-gamma form. The catalyst may be promoted with metallic and non-metallic constituents which have an influence on the hydrogenation-dehydrogenation function of the catalyst. Halogen such as chlorine or fluorine or other catalyst promoters such as boron or rate earth chloride promoters influencing the acidity function of the reforming catalyst may also be employed. The first stage reforming catalyst may be a bimetallic reforming catalyst such as obtained by combining rhenium, ruthenium, cerium, yttrium and other suitable promoting elements with the primary hydrogenation-dehydrogenation component comprising platinum, palladium or rhodium to form catalyst compositions selective for effecting naphthene dehydrogenation to aromatics.

In the method herein defined it is contemplated, as defined above, that the naphthene dehydrogenation catalyst will be employed in one or a plurality of separate and sequentially arranged first stage catalyst beds in one or more sequentially arranged reaction zones. The arrangement of catalyst beds is provided with means for heating the reactant material between beds to compensate for the endothermic heat loss encountered during dehydrogenation of naphthenes. Generally, the catalyst bed or beds in the first stage of the reforming operation will be of a volume which is related to the endothermic heat loss encountered so that a temperature drop not exceeding about 150° F. and preferably less than about 120° F. will be the maximum encountered across a bed of catalyst. The catalyst may be arranged in catalyst beds of increasing bed depth or thickness in the direction of reactant flow. The catalyst bed arrangement is selected to maintain the most selective naphthene dehydrogenation temperature conditions for the particular reforming catalyst composition employed. In this first stage of the reforming operation wherein the predominant reaction is dehydrogenation of naphthenes some isomerization of paraffins is bound to take place. This however is not undesirable to the operation since the products thereof are also relatively high octane product material.

In the first stage of the reforming operation it is preferred that the temperature conditions be selected from within the range of from about 800° F. to about 1,050° F. it being recognized that lower temperature conditions are employed for the fresh catalyst and as the catalyst loses its activity and selectivity, the temperature of the catalyst will be gradually increased to a maximum temperature generally not exceeding about 1,000° F. In the first stage operation of this invention the pressure conditions will be influenced by the naphtha charge composition to be reformed and may be selected from within the range of from about 135 psig to about 600 psig, it being preferred to employ pressures below 400 psig and the lowest pressure possible commensurate with obtaining the naphthene reaction desired over an extended operating period. The space velocity of the reactants passing through the catalyst bed(s) may vary over a relatively wide range and usually will be selected from within the range of from about 2.0 to about 10.0 v/v per hr., based on the total volume of catalyst in the first stage reactors.

It will be observed by those skilled in the art that the first stage of the reforming operation according to the method of this invention is primarily to effect dehydrogenation of naphthene constituents in the naphtha charge and this can be accomplished within some considerable variation in operating limits which will be particularly dependent upon the catalyst employed and the charge material to be reformed. Thus any limits on operating conditions selected to effect aromatization of naphthenes should be those which will assure that no more than about 15 weight percent and preferably less of the naphthenes will remain in the paraffin containing product stream going to the second stage or paraffin dehydrocyclization stage.

The product effluent of reduced naphthene content and obtained from the first stage operation above discussed is then passed all or in part to the second stage operation of this invention arranged and maintained for effecting primarily cyclization of paraffins in the naphtha charge. In the second stage operation a single catalyst bed or a plurality of catalyst beds sequentially arranged in one or more reactors is provided to permit optimizing the selectivity of the operation. In accordance with this invention the second stage of the operation is maintained at a significantly lower pressure than the first stage operation and is usually maintained at a pressure which does not exceed about 100 psig pressure and preferably is maintained at less than about 75 psig pressure. The second stage low pressure operation is effected using a reactant space velocity greater than about 3 v/v per hour and preferably the reactants space velocity is at least about 4 v/v hr., based on the total catalyst volume in the second stage. The upper limit to this space velocity will probably not exceed about 10, but may go as high as about 15. In the second stage operation the temperature is selected from within the temperature range of from about 800° F. to about 1,100° F. with the temperature selected being particularly related to the condition or activity of the catalyst. In this second stage operation the temperature will be selected depending upon catalyst age, to effect primarily dehydrocyclization of paraffins to aromatics while minimizing cracking of the paraffins to lower boiling paraffin products. In the second stage a noble metal reforming catalyst composition is employed, it being desirable to select one which is particularly suitable and selective for effecting the dehydrocyclization of paraffins to aromatics. Thus the combination of processing steps herein defined, catalyst employed and particularly the relationship of operating conditions between the first and second stages have been found to considerably enhance the formation of aromatics from the naphthene and paraffin constituents of the hydrocarbon charge.

In the method and combination of processing steps of this invention hydrogen rich gas is charged to the first stage with the naphtha boiling range hydrocarbon in an amount to maintain the molar ratio of hydrogen to hydrocarbon selected from within the range of from about 1 to about 20 and preferably selected from within the range between about 2 and about 10. All or a portion of this hydrogen-rich gas may be recycled to the first stage following liquid-gas separation after either the first or the second stage. Hydrogen-rich gas is also charged with the hydrocarbon reactants material to the second stage in an amount so that the hydrogen to naphtha molar ratio will be in the range of from about 0.5 to 20, preferably from about 0.5 to about 10. In the interest of economy and efficiency of operation it is preferred that a substantial portion, if not all, of the on-stream hydrogen requirements of the second step be furnished by the hydrogen-rich gas produced in the first stage of operation. Thus all or a portion of the total effluent from the first stage will be cascaded to the second stage. In one embodiment of this invention it is contemplated operating the second stage as a once-through operation so that the recycle of hydrogen gas can be eliminated in the second stage operation. If additional hydrogen is required over the available from the first stage in the once-through second stage operation, it is intended that it be supplied from some available external source other than by recycle from the second stage operation.

However, in another embodiment recycle of the hydrogen-rich gas through the second stage is contemplated.

The catalyst employed in the second stage or paraffin dehydrocyclization stage may be the same as that employed in the first stage or it may be a different catalyst particularly selective for paraffin cyclization to aromatics. In any event a noble metal catalyst may be employed and particularly one comprising platinum, palladium, rhodium or other noble metals alone or in combination with one another and/or combinations thereof with known promoting metals as discussed hereinbefore and their compounds, for example, oxides, sulfides and halides. In particular the noble metal catalysts particularly employed in the paraffin dehydrocyclization step of this invention are those which are sufficiently active to permit use of space velocities of at least 3 v/v/hr. and preferably at least 4 v/v/hr., based on the total volume of catalyst in the second stage.

It is readily apparent from the above discussion that the present invention is particularly concerned with decoupling the reactions of catalytic reforming so as to improve upon the formation of aromatics to a greater extent than performed heretofore. This decoupling is accomplished to a much greater extent provided naphthenes in the charge are more completely aromatized in the first stage and limited in the paraffin charge to the dehydrocyclization step to below about 5 weight percent. Furthermore, dehydrocyclization of paraffins is particularly effected at a significantly reduced pressure below about 100 psig and high reactant space velocity of at least 3 v/v/hr. relationship in the paraffin dehydrocyclization step.

In the method of this invention platinum reforming catalyst compositions whether bimetallic compositions such as platinum in combination with rhenium, ruthenium, a rare earth metal or iron or platinum or palladium alone in combination with an alumina matrix which catalyst compositions may or may not be promoted by halogen or other suitable promoters may be employed in either stage of the reforming process with considerable success provided the particular relationship or operating conditions above identified are maintained in each stage. Furthermore considerable latitude in operating conditions employed in each stage of operation of this invention is possible and this latitude is necessitated by virtue of the activity and selectivity characteristics of different catalyst compositions and charge materials which may be employed in each stage of the process. However, it must be remembered that even in this latitude of operation certain basic requirements dominate which are particularly concerned with limiting the naphthene content of the hydrocarbon charge to the second stage, minimizing cracking of paraffin and naphthene constituents in the first stage and maintaining a particular pressure-space velocity relationship in at least the second stage to maximize paraffin cyclization to aromatics. As mentioned hereinbefore, in the second stage or paraffin dehydrocyclization stage, the operating conditions are restricted so as to maintain the pressure therein in the range of from about 1 atmosphere up to about 100 psig but more usually in the range of from about 1 atmosphere up to about 75 psig. In a particular embodiment the pressure of the second stage or paraffin dehydrocyclization stage should be maintained below about 60 psig but preferably at least about 1 atmosphere pressure while maintaining the space velocity of the reactants in contact with the second stage catalyst at least about 4 v/v per hour to optimize the desired cyclization of paraffins. A space velocity of at least 5 v/v/hr may be also employed with considerable success.

It has been found desirable in addition to the above to monitor the activity and selectivity of a particular reforming catalyst composition by the use of sulfur, water, nitrogen and in some instances depending upon the catalyst composition, the chloride level of the catalyst atmosphere or environment should be closely controlled. Thus it has been found that marked advantages can be realized in the selectivity of the chemistry involved during the reforming operation with different reforming catalyst compositions by exercising a close control on the level of moisture in contact with the catalyst particularly during on-stream operation in the separate stages of the process. It is preferred that the level of moisture be held within restricted limits in the range of from about 5 to 25 ppm of water as conveniently measured in the gaseous reformate effluent obtained from the process. In operations involving the use of bimetallic catalysts promoted with chloride, for example, it is also important to continually monitor and maintain the chloride level of the catalyst so that it will maintain its selectivity over an extended operating period for particularly effecting paraffin dehydrocyclization. Reforming operations effected in the presence of bimetallic catalysts are particularly influenced by the concentration of moisture and chloride in the atmosphere within which the catalyst operates. On the other hand, a reforming catalyst comprising a noble metal and selected from the group consisting essentially of platinum, palladium, rhodium, osmium and iridium or combinations thereof deposited on an alumina carrier primarily in the eta, gamma, or mixed eta-gamma form, with or without a halogen or other suitable promoter in an amount selected from within the range of from about 0.2 up to about 2 percent by weight, but more usually not more than about 1 percent by weight may also be employed. It has been found advantageous to employ relatively large amounts of sulfur in the range of from about 50 up to about 10,000 ppm, such as about 300 ppm of sulfur based on the naphtha charge with the paraffinic charge to the second stage as a method for controlling the selectivity of the catalyst for effecting paraffin cyclization. In this particular embodiment it has been found that fairly large concentrations of sulfur in the naphtha charge to the second stage will be effective to optimize catalyst selectivity in the second stage. Thus in this particular embodiment using a non-bimetallic reforming catalyst, especially platinum catalysts, it is possible in some circumstances to eliminate a pre-treatment or sulfur-removal step for the naphtha charge passed to the combination of reforming steps herein described. On the other hand, when using a bimetallic reforming catalyst composition such as platinum promoted with rhenium and chlorine, this bimetallic catalyst was found not to respond to the addition of sulfur in the same manner as the non-bimetallic reforming catalyst. Therefore, elimination of a naphtha desulfurization or pretreat step in a reforming operation employing bimetallic reforming catalyst in both stages is of no merit. However, using a bimetallic catalyst only in the second stage, and a non-bimetallic catalysts, especially a platinum catalyst, in the first stage sulfur removal prior to the first stage can some times be eliminated providing gas separation takes place between the two stages. In any case, the method of the present invention is particularly improved when the concentration of naphthenes in the paraffin charge in the second stage is maintained below 5 weight percent and the pressure-space velocity relationship in the second stage is maintained within the limits particularly discussed herein.

EXAMPLE 1

A series of experiments were carried out to exemplify conventional "low pressure" three reactor reforming operation. In these experiments the charge naphtha used was a $C_6-290°$ F. Mid-Continent naphtha fraction. The catalyst was a platinum catalyst comprising 0.6 weight percent platinum distributed on eta-alumina and contained about 0.7 weight percent chloride. The runs were made at 1.2 LHSV with a $H_2$ :naphtha mole ratio of about 6.8 at about 185 psig total pressure. The temperature was varied to vary the degree of reforming. The results obtained in terms of the volume of $C_5^+$ reformate and the octane number obtained in these experiments are shown on the accompanying FIG. 1. The curve is identified as "Conventional Reforming."

EXAMPLE 2

To obtain reformate produce material representative of the first stage product of the invention and comprising aromatics and paraffins, a 2-gallon sample of material was produced in a three-reactor reforming operation using the catalyst identified in Example 1 under the following conditions. The charge naphtha was a $C_6$-290° F. Mid Continent straight run naphtha fraction which was reformed at a temperature in the range of 885° F. to about 895° F. in combination with a hydrogen/naphtha hydrocarbon ratio of about 6.8. The space velocity (LHSV) was 1.2 and the pressure about 185 psig. The product of this operation was depentanized to produce a $C_6^+$ fraction representing 88.5 wt. percent of its original charge. This $C_6^+$ reformate product was found to contain 50 vol. percent of alkyl benzenes, 47 vol. percent of paraffins and 2 vol. percent of monocycloparaffins. This corresponds to 56 percent alkyl benzenes, 41 percent paraffins and 2 percent monocycloparaffins (naphthenes) by weight and comprised 88.5 weight percent of the charge naphtha. The yield of $C_5$ and lighter hydrocarbon was slightly less than 10 percent. The hydrogen yield was 2 percent. It had an octane rating of 97.7 R+3. Portions of this $C_6^{115}$ paraffin rich reformate first stage product were thereafter separately subjected to four different experimental runs carried out under atmospheric pressure conditions and a liquid hourly space velocity of about 5 employing a platinum reforming catalyst comprising 0.35 weight percent platinum dispersed on eta alumina and promoted with about 0.3 weight percent of chloride. The differences in the four experimental runs and results obtained are presented in the table below, wherein the yield results are calculated on the basis of the original $C_6$-290° F. naphtha charged to the first stage:

TABLE

| Run Number | 1 | 2 | 3 | 4 |
|---|---|---|---|---|
| Catalyst presulfided [1] | Yes | Yes | Yes | Yes |
| Sulfur in charge, p.p.m.[2] | 0 | 0 | 0 | 1,000 |
| $H_2$=HC mole ratio | 0 | 1:1 | 4:1 | 4:1 |
| Temperature, ° F | 956-964 | 940-956 | [3] 890-976 | [3] 880-970 |
| O.N., R+3 at run time, hr.: | | | | |
| 0-1 hr | 101.7 | 107.6 | 108.4 | 107.4 |
| 1-2 hr | 99.0 | 103.6 | 104.2 | 105.5 |
| 2-3 hr | 98.8 | 102.4 | 103.6 | 104.7 |
| 3-4 hr | 98.7 | 102.0 | 102.6 | 104.0 |
| 4-5 hr | | | | 102.3 |
| O.N., R+3, composite product | 99.5 | 103.7 | 104.2 | 105.4 |
| $C_6^+$ reformate, vol percent [4] | 79.2 | 76.2 | 76.0 | 74.3 |
| Yield advantage [5] | -1.2 | 4.7 | 5.6 | 7.3 |
| Octane advantage [6] | -0.8 | +2.1 | +2.4 | +3.0 |
| Carbon on catalyst, wt. percent | 23.8 | 11.8 | 6.6 | 5.7 |

[1] Catalyst presulfiding: 1 hr. at 950° F., 1 percent $H_2S$ in $H_2$.
[2] Sulfur in charge added as thiophene.
[3] Furnace temperature raised progressively with run time.
[4] Yield based on $C_6$ -290° F. naphtha charge.
[5] Difference in yield between our examples and yield given by "Conventional Reforming" standard curve at same octane number (R+3).
[6] Difference in octane number (research containing 3 cc. TEL) of our example and O.N. given by standard curve at same yield.

It will be observed upon examination of the data presented in the table that Run No. 1 was carried out in the absence of hydrogen combined with the hydrocarbon charge and thus showed relatively poor results as evidenced by the octane number obtained, a negative yield-octane advantage and the rather significant amounts of coke deposited on the catalyst. Run No. 2, however, using a hydrogen to hydrocarbon ratio of 1:1 shows some significant improvement in the yield octane advantage, octane rating of the product and a reduction in coke deposited on the catalyst. In Runs 3 and 4 using a hydrogen to hydrocarbon ratio of 4:1 a significantly higher octane number product material is obtained in addition to significant advantage in the yield-octane relationship with Run No. 4 showing the greater advantage. It is to be noted that the temperature during reforming in Runs 3 and 4 was progressively raised with run time. It will be observed from the Table that in each of the Runs 2, 3, and 4 which are exemplary of the present invention a significant improvement in the octane number of the product was obtained and this improvement is due to cyclization of paraffins to aromatics. In Run 4 the presence of considerable sulfur (1,000 ppm) in the naphtha charge showed that the presence of such large amounts of sulfur resulted in a higher average octane number of the product and did not undesirably influence the selectivity of the catalyst employed.

To further emphasize the rather significant improvement obtained by upgrading naphtha boiling range hydrocarbons in accordance with the method of the present invention accumulated data were plotted to form the curve presented in the attached figure. The FIGURE including two curves draws a significant comparison between the yield-octane relationship when reforming under conventional conditions at a pressure of about 185 psig and when reforming a naphtha charge in accordance with the method of the present invention. The curve identified with circular data points identifies the conventional reforming operation effected at a pressure of 185 psig (as per Example 1) whereas the curve identified with triangular data points identifies the results obtained when upgrading a naphtha charge by the combination of reforming steps of the present invention (as per Example 2). It is apparent from the curves that a significant improvement in octane-yield advantage above about 98 octane is obtained in a reforming operation conducted in accordance with the method of this invention. It is known that effecting the conventional reforming operation at a higher pressure than about 185 psig would not provide a yield-octane advantage relationship over that shown in the 185 lb operation. It is to be particularly noted from the curve that as the octane value of the product exceeds 100 a significantly greater octane-yield advantage is obtained by reforming a naphtha charge in accordance with the method and combination of steps disclosed by the present invention. These data further illustrate that a significant loss in yield is obtained when reforming naphthas to produce a product having an octane rating in excess of 100 and particularly in excess of 103 R+3.

Thus an aspect of the present invention resides in performing the first stage reforming operation to provide a naphtha product enriched in aromatics having an octane rating up to about 1100 (R+3) but preferably the octane rating is not above about 98 (R+3). The product thus obtained comprising paraffins and aromatics is thereafter subjected to paraffin cyclization conditions at a pressure below 100 psig wherein the octane rating is further raised at least 3 (R+3) numbers and preferably 5 (R+3) octane numbers.

Having thus provided a general description of the improved method of this invention and provided specific teachings in support thereof it is to be understood that no undue restrictions are to be imposed by reason thereof except as defined in the following claims

We claim:
1. A method for reforming a naphtha charge material comprising naphthenes and paraffins which comprises:
    reforming a naphthenic naphtha charge comprising paraffins in the presence of hydrogen and a platinum reforming catalyst at a pressure in the range of 135 to 400 psig under temperature and space velocity conditions which will restrict cracking of the naphtha charge to yield less than 10 weight percent of $C_5$ and lighter cracked hydrocarbons thereby providing a reformed effluent containing less than 5 vol. percent of naphthenes and thereafter dehydrocyclizing paraffins in the naphtha reformed effluent over a platinum reforming catalyst at a pressure maintained at less than 75 psig utilizing a reactant space velocity of at least 3 v/v/hr. and a hydrogen to hydrocarbon ratio of at least 1.

2. The method of claim 1 wherein the platinum type reforming catalyst is platinum dispersed on an alumina matrix promoted with chlorine and sulfur is maintained in the charge during cyclization of paraffins to form aromatics.

3. The method of claim 1 wherein the platinum type reforming catalyst is a bimetallic reforming catalyst which relies upon a metal halide complex as a promoter.

4. The method of claim 1 wherein the moisture level of the reforming operation is restricted to within the range of 5 to 25 ppm of water as measured in the gaseous effluent of the process.

5. The method of claim 1 wherein a bimetallic platinum containing reforming catalyst is employed under restricted moisture conditions and the catalyst has an acid function which is controlled during paraffin conversion by the addition of chlorine with the paraffin charge.

6. The method of claim 1 wherein hydrogen is generated during the reforming operation and the generated hydrogen is relied upon to maintain the desired hydrogen to hydrocarbon ratio employed in each step of the reforming operation.

* * * * *

PO-1050
(5/69)

UNITED STATES PATENT OFFICE
CERTIFICATE OF CORRECTION

Patent No. 3,669,875        Dated June 26, 1972

Inventor(s) C. J. PLANK, P. G. WALDO and H. G. DOHERTY

It is certified that error appears in the above-identified patent and that said Letters Patent are hereby corrected as shown below:

Column 2, line 30 : after "the" insert --second--

Column 3, line 22 : "rate" should be --rare--

Column 6, line 74 : "produce" should be --product--

Column 7, line 19 : "$C_6^{115}$" should be --$C_6^+$--

Column 7, line 33 : "$H_2=HC$" should be --$H_2:HC$--

Column 8, line 30 : "1100" should be --100--

Signed and sealed this 10th day of October 1972.

(SEAL)
Attest:

EDWARD M. FLETCHER, JR.
Attesting Officer

ROBERT GOTTSCHALK
Commissioner of Patents